United States Patent
Shinozaki

(10) Patent No.: US 7,270,421 B2
(45) Date of Patent: Sep. 18, 2007

(54) PROJECTOR, PROJECTION METHOD AND STORAGE MEDIUM IN WHICH PROJECTION METHOD IS STORED

(75) Inventor: Yoshihiko Shinozaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 265 days.

(21) Appl. No.: 11/048,540

(22) Filed: Jan. 31, 2005

(65) Prior Publication Data
US 2005/0237492 A1 Oct. 27, 2005

(30) Foreign Application Priority Data
Feb. 3, 2004 (JP) ............... 2004-026540

(51) Int. Cl.
*G03B 21/00* (2006.01)
(52) U.S. Cl. .................. 353/69; 353/70; 353/121
(58) Field of Classification Search .............. 353/30, 353/69, 70, 121; 352/40, 140
See application file for complete search history.

(56) References Cited

U.S. PATENT DOCUMENTS 7,070,283 B2 * 7/2006 Akutsu .................. 353/69

2002/0051095 A1 * 5/2002 Su ........................ 348/745

FOREIGN PATENT DOCUMENTS

| JP | 2003-5277 A | 1/2003 |
| JP | 2003-5279 A | 1/2003 |
| KR | 10-0159597 B1 | 8/1998 |
| WO | WO 02/101443 A2 | 12/2002 |

* cited by examiner

*Primary Examiner*—Melissa Jan Koval
(74) *Attorney, Agent, or Firm*—Frishauf, Holtz, Goodman & Chick, P.C.

(57) ABSTRACT

A projection system is provided which includes a projection lens and a spatial optical modulation device (SOM) for projecting an image in response to an inputted picture signal. A control unit enables the selection, via an image adjustment menu, of at least one of a rotational deformation adjustment in which a projected image is rotated and a keystone deformation adjustment in which the projected image is deformed into a rectangle, and the control unit applies a rotational deformation adjustment and a keystone deformation adjustment to the projected image based on an item selected in the image adjustment menu in response to a deformation indication inputted from a keys/indicators unit, so as to deform the projected image.

5 Claims, 13 Drawing Sheets

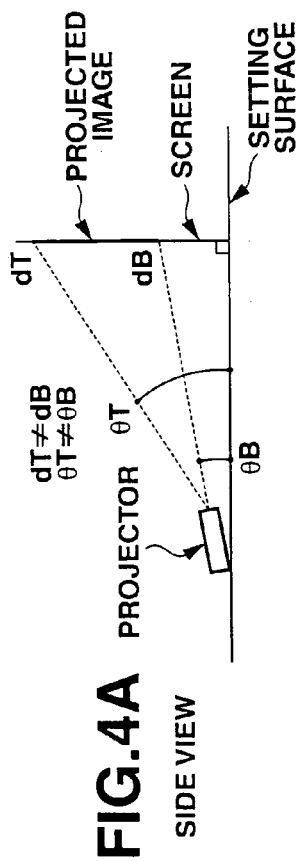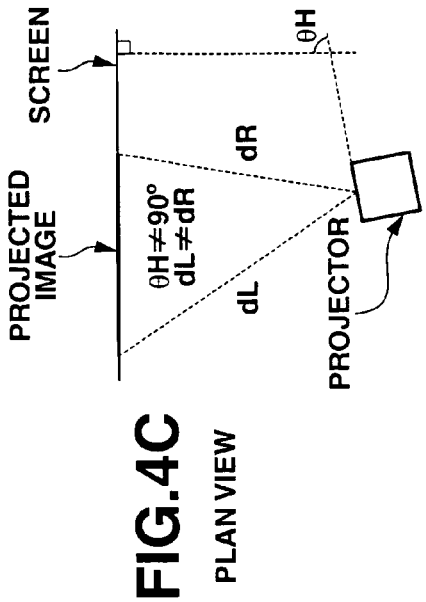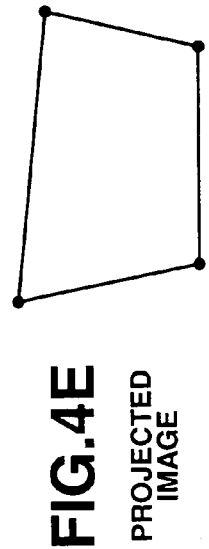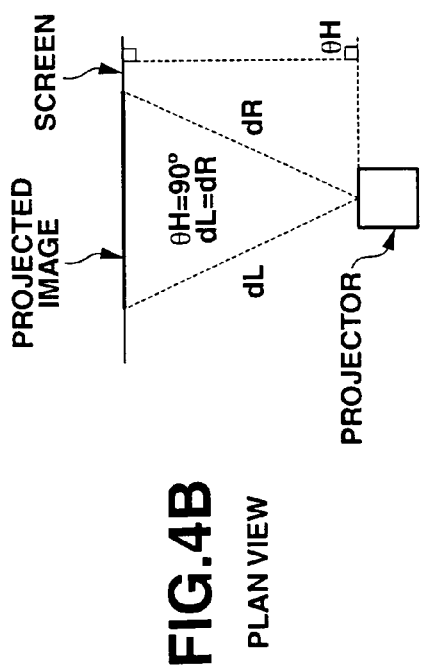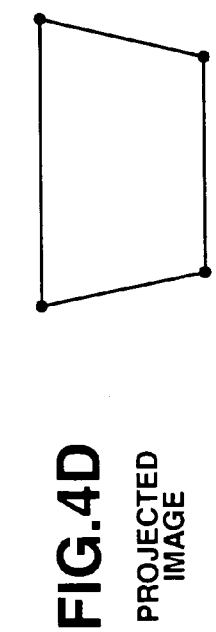
FIG.4A SIDE VIEW
FIG.4B PLAN VIEW
FIG.4C PLAN VIEW
FIG.4D PROJECTED IMAGE
FIG.4E PROJECTED IMAGE

SIDE VIEW

REAR VIEW

PLAN VIEW

REAR VIEW

PROJECTOR, PROJECTION METHOD AND STORAGE MEDIUM IN WHICH PROJECTION METHOD IS STORED

BACKGROUND OF THE INVENTION

1. Field of the Invention

The present invention relates to a projector having a function to automatically focus a projected image.

2. Description of the Related Art

Currently, projectors of a type are used generally which projects images on a screen. In addition, there is a tendency of miniaturizing projectors, and there appear projectors such as carried easily to be set at any place the user wants for projection.

In such portable projectors, in the event that a projector and a screen are set properly, the outline of a projected image is formed into a shape that does not match the user's intent. Normally, in many cases, projectors are used such that the outline of an image projected on to the screen becomes a rectangle.

Conventionally, in order to correct keystone distortion that is generated when the screen is inclined relative to a projecting direction from the projector, there has been devised a system made up of an angle detection unit for detecting vertical and horizontal inclinations and a projector which corrects a distortion based on information on the inclinations detected by the angle detecting unit (for example, Patent Document No. 1).

In addition, there has been proposed a projector in which horizontal adjustment and elevation angle adjustment can easily be implemented while watching a projected image by providing extendable legs in such a manner as to be suspended from a main body of the projector (for example, Patent Document No. 2).

[Patent Document No. 1] Japanese Unexamined Patent Publication No. 2003-5277

[Patent Document No. 2] Japanese Unexamined Patent Publication No. 2003-5279

In the system described in Patent Document No. 1, however, the angle detecting units are necessary in addition to the projector, and after the vertical and horizontal inclinations of the screen have been detected using this detecting unit, the inclination of the projector needs to be detected. Thus, it takes some labor hours to correct the distortion of a projected image. For example, when the conditions where the screen and the projector are set are changed, the same process has to be repeated every time such a change is implemented. In addition, in a case where the projected image is distorted in a rotational fashion in association with the inclination of the projector, the proposed projector cannot deal with such a case.

In addition, in the projector described in Patent Document No. 2, while a horizontal adjustment in which lateral inclinations are adjusted, a tilt adjustment in which longitudinal inclinations are adjusted and, furthermore, an adjustment in which horizontal inclinations are adjusted can be implemented, no correction is possible in the event that a projected image contains a rotational distortion and a keystone distortion.

SUMMARY OF THE INVENTION

According to one aspect of the present invention, a projector includes: a projection unit which projects an image in response to an inputted image signal, a detection unit which detects an inclined angle of the projector, a calculation unit which calculates a rotational adjustment amount for the projected image based on the detected inclined angle, and a rotational deformation unit which rotationally deforms the projected image in accordance with the calculated rotational adjustment amount.

In addition, the projector may include a keystone deformation unit which deforms the projected image that has been rotationally deformed by the rotational deformation unit into a rectangle. The projector may also include a deformation setting unit which sets whether or not the rotational deformation is executed by the rotational deformation unit. Still further, the projector may include a movement detector which detects vibrations generated when the protector is moved.

BRIEF DESCRIPTION OF THE DRAWINGS

FIGS. 4A to 4E show diagrams explaining a relationship between a set condition of the projector 10 and a projected image projected on a screen.

DESCRIPTION OF THE PREFERRED EMBODIMENTS

Embodiments of the invention will be described below by reference to the accompanying drawings.

FIG. 1 shows perspective views illustrating an external construction for embodiments (first to fourth embodiments) in which the invention is applied to a projector.

Figure 1A:
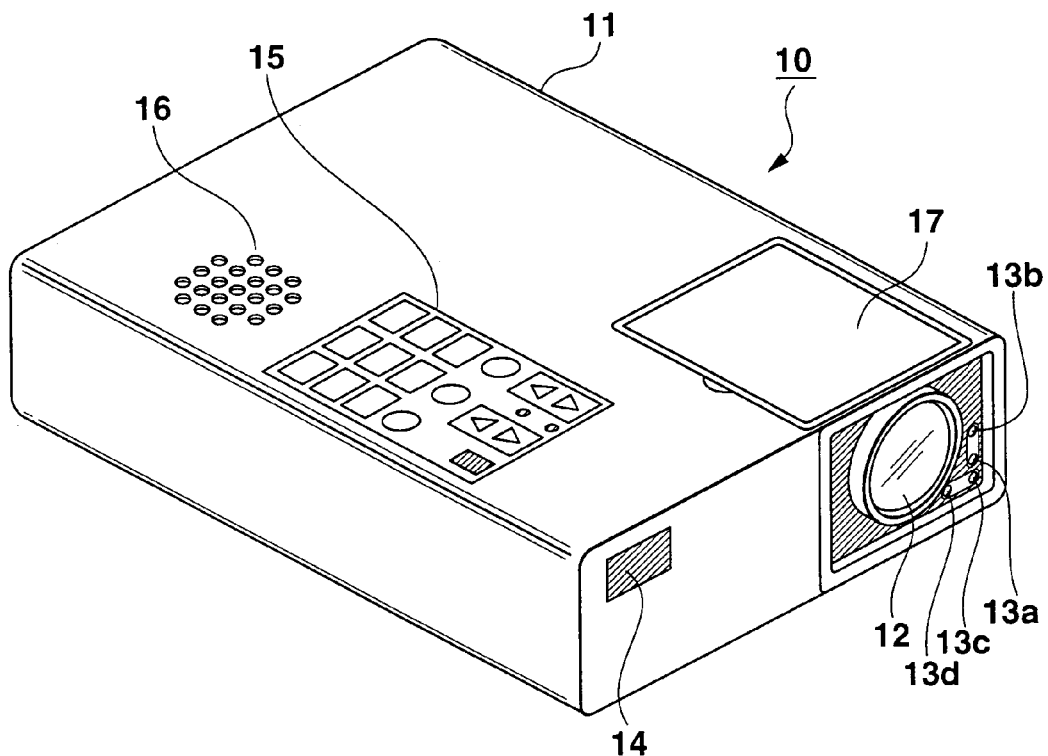
FIGS. 1A and 1B show perspective views illustrating an external construction for embodiments (first to fourth embodiments) in which the invention is applied to a projector.

As shown in FIG. 1A, a projection lens 12, two pairs of distance measuring lenses 13a, 13b and 13c, 13d, and an Ir reception unit 14 are disposed on a front side of a rectangular parallelepiped-like main body casing 11.

The projection lens 12 is intended to project an optical image formed by a spatial optical modulation element such as a micromirror device, which will be described later on, and here the projection lens 12 is made to optionally change a focus position and a zoom position (projection angle).

The distance measuring lenses 13a, 13b and 13c, 13d are provided, for example, in the vicinity of the projection lens 12 and make up part of phase-difference sensors 131, 132, respectively. The distance measuring lenses 13a, 13b and 13c, 13d measure a distance to a subject image from a parallax error at each pair of lenses relative to the subject image based on the principle of triangulation or, to be specific, a distance to the surface of a projected image.

To be specific, a vertical distance to the subject is measured by the pair of distance measuring lenses 13a, 13b, which are arranged in a vertical direction, and a horizontal distance to the subject is measured by the other pair of distance measuring lenses 13c, 13d, which are arranged in a horizontal direction.

The Ir reception unit 14 receives an infrared light on which a key operation signal from a remote controller, not shown, of the projector 10 is superimposed.

In addition, the main body main keys/indicators 15, a speaker 16 and a cover 17 are disposed on an upper side of the main body casing 11.

The main body main keys/indicators 15 will be described in detail later on.

The speaker 16 outputs sound and/or voice loudly when dynamic images are reproduced.

The cover 17 is opened when sub keys, not shown here, are operated. The sub keys control various types of detailed operations which cannot be set and indicated by keys of the main body main keys/indicators 15 when the remote controller, not shown, of the projector 10 is not used.

Figure 1B:
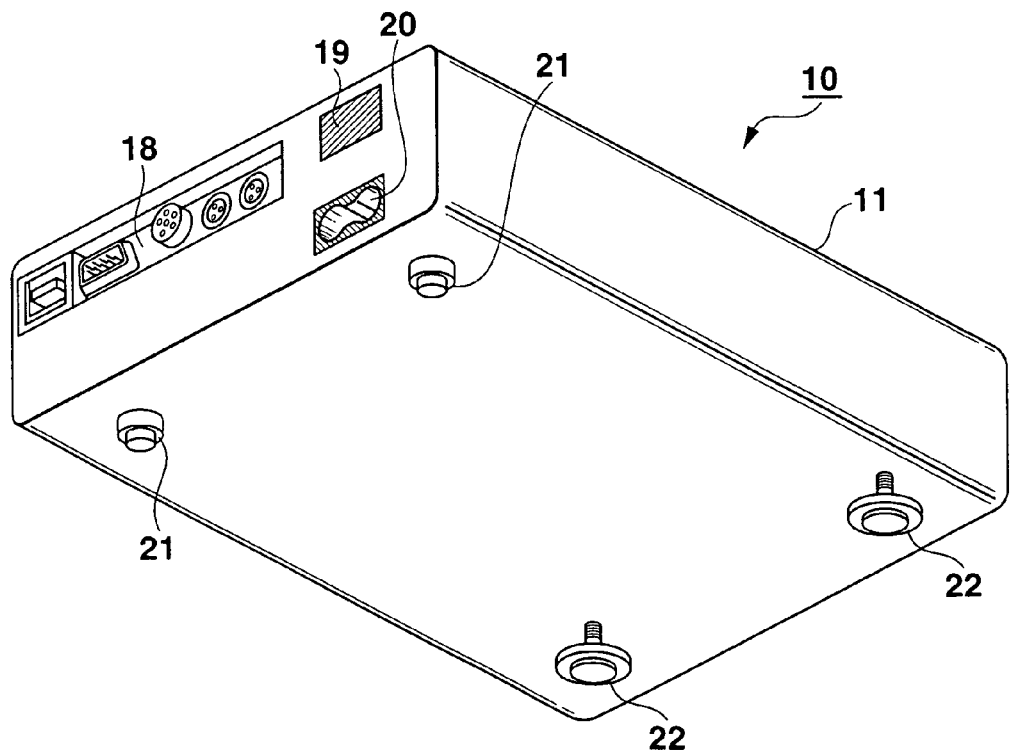

Furthermore, as shown in FIG. 1B, an I/O connectors port 18, an Ir reception unit 19 and an AC adaptor connection port 20 are disposed on a back side of the main body casing 11.

The I/O connectors port 18 includes a USB terminal for connection with external equipment such as a personal computer, an input mini D-SUB terminal, an S terminal and an RCA terminal, which are for video input, and a stereo mini terminal for audio input.

The Ir reception unit 19 receives, similarly to the aforesaid Ir reception unit 14, an infrared light on which a key operation signal from a remote controller, not shown, is superimposed.

The AC adaptor connection port 20 is connected with a cable from an AC adaptor, not shown, which constitutes a power supply.

In addition, a pair of stationary leg portions 21, 21 is mounted on a lower side of the main body casing 11 towards the back side thereof, whereas a pair of adjustment leg portions 22, 22, whose height can be adjusted, is mounted on the lower side of the casing towards the front side thereof.

The adjustment leg portion 22 is adapted to extend and contract when screwed out and in, and the screwed position thereof is controlled by being driven by an adjustment leg driving unit 46, which will be described later on. A vertical component of the projection direction of the projection lens 12 or the elevation angle thereof can be adjusted by making the adjustment leg portions 22 extend or contract.

Note that an inclined angle measuring unit 44, the adjustment leg driving unit 46 and the adjustment leg portions 22 are constituent components which are used in third and fourth embodiments and are not necessary in first and second embodiments of the invention.

Figure 2:
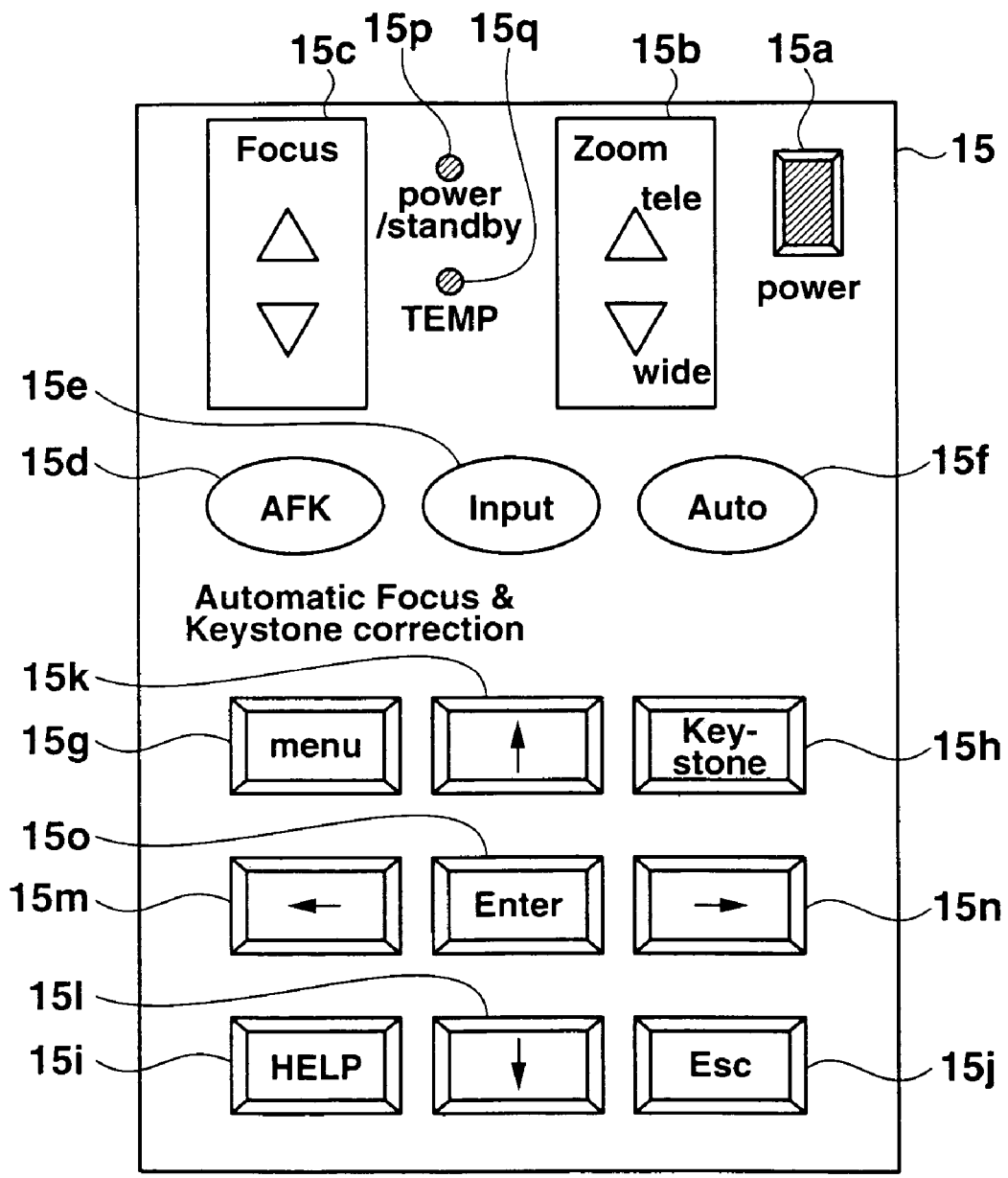
FIG. 2 is a diagram showing a detailed arrangement of main body main keys/indicators 15.

Next, by reference to FIG. 2, a detailed arrangement of the main body main keys/indicators 15 will be illustrated. Namely, the main body main keys/indicators 15 include a power (power) key 15a, a zoom (Zoom) key 15b, a focus (Focus) key 15c, an "AFK" key 15d, an "Input" key 15e, an "Auto" key 15f, a "menu" key 15g, a "Keystone" key 15h, a "HELP" key 15i, an "Esc" key 15j, an "up (↑)" key 15k, a "down (↓)" key 15l, a "left (←)" key 15m, a "right (→)" key 15n and an "Enter" key 15o, and a power/standby (power/standby) key 15p and a temperature (TEMP) indicator 15q.

The power key 15a indicates on/off of a power supply.

The zoom key 15b indicates zoom-in (tele) and zoom-out (wide) by operating "Δ" and "∇".

The focus key 15c indicates forward and rearward translations of a focus position by operating "Δ" and "∇".

The "AFK" key 15d indicates an instantaneous implementation of an automatic focusing (Automatic Focus) and an automatic keystone distortion correction (Automatic Keystone Correction).

The "Input" key 15e indicates a manual changeover of a picture signal which is inputted into any of the terminals in the I/O connectors port 18, and the "Auto" key 15f indicates an automatic changeover of a picture signal which is inputted into any of the terminals in the I/O connectors port 18.

The "menu" key 15g indicates a display of various menu items in relation to projecting operations, and the "Keystone" key 15h indicates a keystone distortion correction operation.

The "HELP" key 15i indicates a display of various help information when an indicated operation is unclear, and the "Esc" key 15j indicates a cancellation of an operation which is being performed at the point in time the key is depressed.

The "up" key 15k, "down" key 15l, "left" key 15m and "right" key 15n are operated to indicate a menu item, a manual keystone distortion correction direction, and a selection or moving direction by a pointer or cursor at the point in time the key is depressed.

The power/standby indicator 15p indicates an on/off state of the power supply and a state in which there is inputted no picture signal by turning on and off or flashing, for example, green and red LED's.

The temperature indicator 15q indicates whether or not the temperature of a lamp constituting a light source of image projection is in a suitable condition for projection by turning on and off or flashing, for example, green and red LED's.

Figure 3:
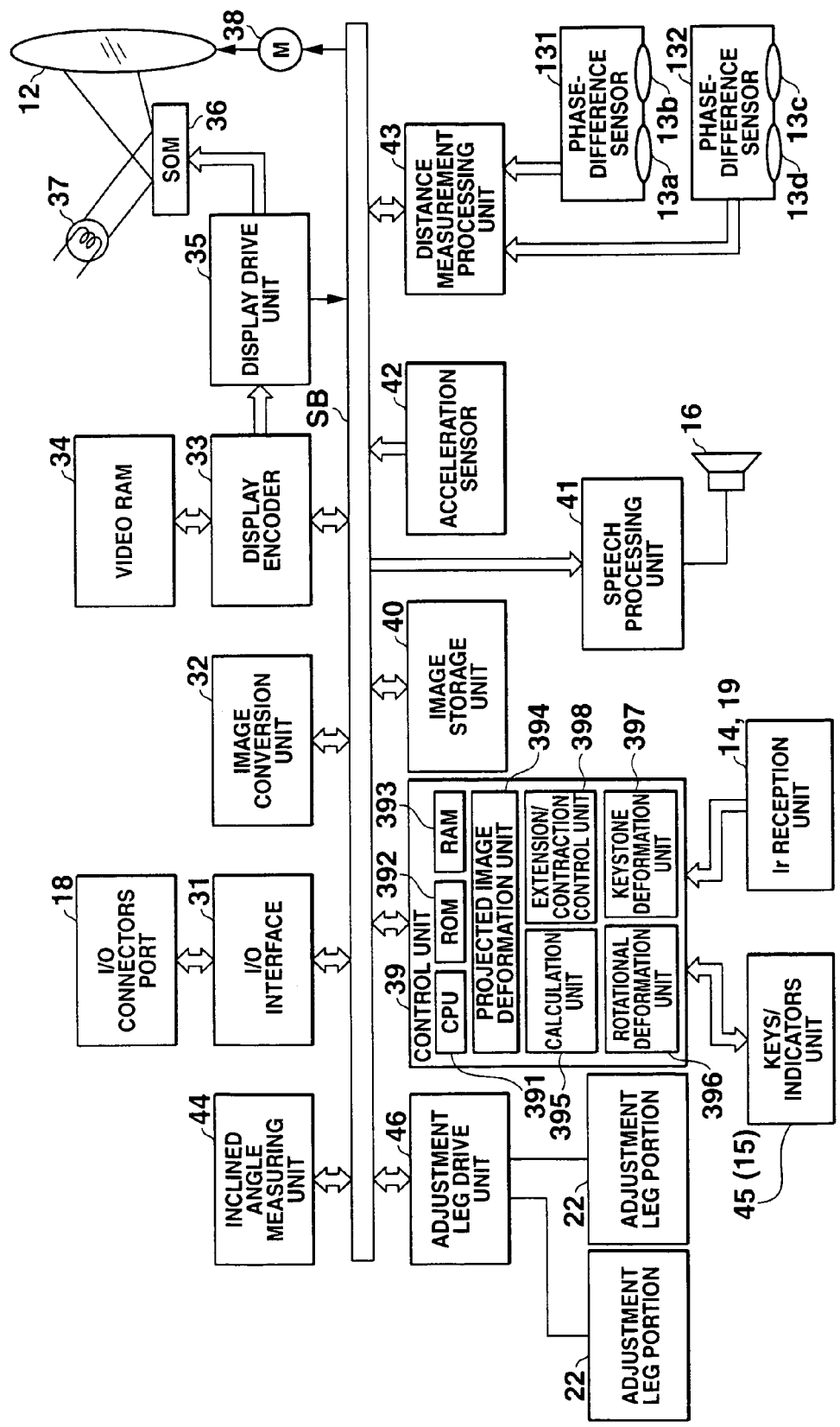
FIG. 3 is a block diagram illustrating the configuration of an electronic circuit of the projector 10 according to the embodiments.

Following this, the function and configuration of an electronic circuit of the projector 10 will be described by reference to FIG. 3. In FIG. 3, picture signals of various standards which are inputted from the I/O connectors port 18 are inputted into an image conversion unit 32 via an I/O interface (I/F) 31 and a system bus SB, and after the picture signals so sent are unified into a predetermined format at the image conversion unit 32, the unified picture signals are sent to a display encoder 33.

The display encoder 33 deploys the picture signals so sent thereto on a video RAM 34 for storage therein and then generates video signals from the contents stored in the video RAM 34 to output video signals so generated to a display drive unit 35.

The display drive unit 35 is such as to display drive a spatial optical modulation element 36 at an appropriate frame rate, for example, 30 "frames/sec" relative to a picture signal sent thereto, and when the spatial optical modulation element 36 is illuminated with a highly bright white light which is emitted by a light source lamp 37 such as an ultra-high voltage mercury lamp, an optical image is formed by a reflected light from the spatial optical modulation element 36 and is then projected to be displayed on a screen, not shown, via the projection lens 12.

However, the projection lens 12 adjusts the zoom position and the focus position as required by being driven by a lens motor (M) 38. Note that the projection lens 12, the spatial optical modulation device (SOM) 36, the light source lamp 37 and the lens motor (M) 38 make up a projection unit.

It is a control unit 39 which governs all operations of respective circuits. The control unit 39 is made up of a CPU 391, a ROM 392 which stores fixedly operation programs to make the CPU 391 execute automatic focusing and automatic keystone distortion correcting processes, which will be described later on, and the like, a RAM 393, which is used as a work memory, a projected image deformation unit 394 for deforming a projected image, a calculation unit 395 for calculating a rotational adjustment amount for a projected image, a rotational deformation unit 396 for rotationally deforming a projected image, a keystone deformation unit 397 for deforming a projected image into a rectangle and an extension/contraction control unit 398.

In addition, an image storage unit 40, a speech processing unit 41, an acceleration sensor (movement detector) 42, a distance measurement processing unit 43, an inclined angle measuring unit 44 and the adjustment leg drive unit 46 are connected to the control unit 39 via the system bus SB.

The image storage unit 40 is made up of, for example, a flash memory and is such as to store an image adjustment menu, which will be described later on, and image data of a user logo image. The image storage unit 40 reads out image data indicated by the control unit 39 as required and send the data so read out to the display encoder 33, so that the images are projected by the projection lens 12 for display.

The speech processing unit 41 has a sound source circuit such as a PCM sound source, converts voice data given at the time of projection and display into analog data and emits loud sound.

The acceleration sensor (movement detector) 42 detects vibrations generated when the projector 10 is moved from where it is set and outputs a detection signal to the control unit 39.

The distance measurement processing unit 43 drives the phase-difference sensor 131 having the distance measuring lenses 13a, 13b and the phase-difference sensor 132 having the distance measuring lenses 13c, 13d so as to measure a distance to the position of any point in a chart image that is projected and displayed, which will be described later on.

The inclined angle measuring unit 44 (a detection unit) detects the angle of the projector 10 relative to a horizontal set surface (the ground surface), that is, the inclined angle of the projector 10 in a vertical direction relative to the projecting direction in the set condition and sends an angle so detected to the control unit 39.

The adjustment leg drive unit 46 is such as to control the drive of the adjustment leg portions 22, 22 (extendable legs) for extension and contraction thereof and has, for example, a motor and a gear for rotating a screw corresponding to each of the adjustment leg portions 22, 22. For example, when the motor is rotated clockwise, the adjustment leg portion 22 extends, whereas when the motor is rotated counterclockwise, the same leg portion 22 contracts. The adjustment leg drive unit 46 controls the adjustment leg portions 22, 22 individually for extension and contraction thereof so that the respective leg portions can extend or contract to different lengths.

Note that the main body main keys/indicators 15 (selection unit, input unit, deformation setting unit) and main body sub keys provided under the cover 7 make up a keys/indicators unit 45, and key operation signals generated in this keys/indicators unit 45 are sent directly to the control unit 39. In addition, the control unit 39 directly drives the power/standby indicator 15p and the temperature indicator 15q to turn on or flash, while infrared light reception signals generated in the Ir reception unit 14 and the Ir reception unit 19 are also directly inputted into the control unit 39.

Next, a relationship between a set condition of the projector 10 and a projected image that is projected on a screen will be described below.

FIG. 4A shows a side view illustrating a state in which an image is projected on to a screen from the projector 10 (a projection apparatus). As shown in FIG. 4A, the screen is set to stand vertical to a predetermined height from a setting surface (the ground surface) on which the projector 10 is set. In this case, assuming that an angle formed by a line which connects the projector 10 (the projection lens 12) with an upper side of the projected image and the setting surface is θT and that a angle formed by a line which connects the projector 10 (the projection lens 12) with a lower side of the projected image and the setting surface is θB, then θT≠θB (θT>θB), and assuming that a distance to the upper side of the projected image is dT and that a distance to the lower side thereof is dB, then dT≠dB (dT>dB).

FIG. 4B is a plan view resulting when the state shown in FIG. 4A is seen from the top. In a set condition shown in FIG. 4B, the projecting direction of the projector 10 on a plane facing the screen is normal (θH=90°), and assuming that a distance from the projector 10 (the projection lens 12) to a left side of the projected image is dL and that a distance to a right side of the projected image is dR, then dL=dR.

In this case, as shown in FIG. 4D, the projected image that is projected on to the screen by the projector 10 is deformed into a keystone or trapezoidal shape having a loner upper side.

In addition, in a set condition shown in FIG. 4C, the projecting direction of the projector 10 on the plane facing the screen is inclined (θH≠90°) (θH<90°), and dL≠dR (dL>dR).

In this case, as shown in FIG. 4E, the projected image that is projected on to the screen by the projector 10 becomes a trapezoidal shape which is deformed such that a left side of the projected image shown in FIG. 4D becomes longer.

Furthermore, FIG. 5 shows a set condition of the projector 10 when a projected image projected on to the screen is rotated. FIG. 5A shows a side view, and FIG. 5B shows a plan view. As shown in FIG. 5C, the projecting direction of the projector 10 on the plane facing the screen is inclined (θH≠90°) (θH<90°), and let's assume that dL≠dR (dL>dR).

Figure 5A:
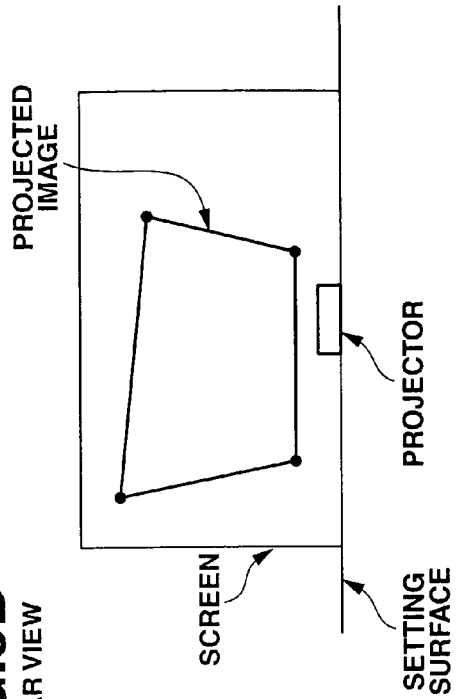
FIGS. 5A to 5D show diagrams explaining a relationship between a set condition of the projector 10 and a projected image projected on a screen.
Figure 5B:
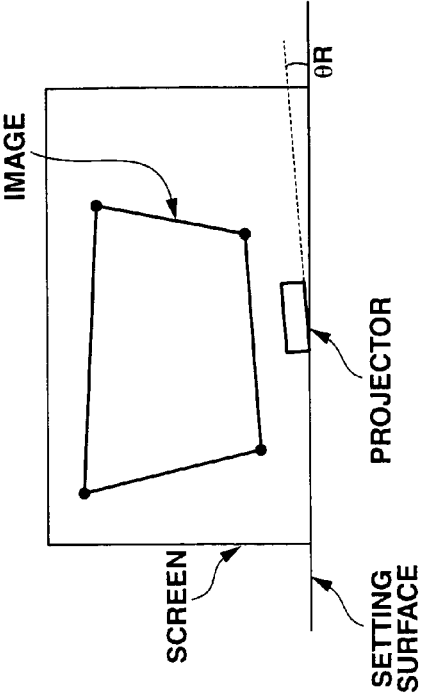
Figure 5C:
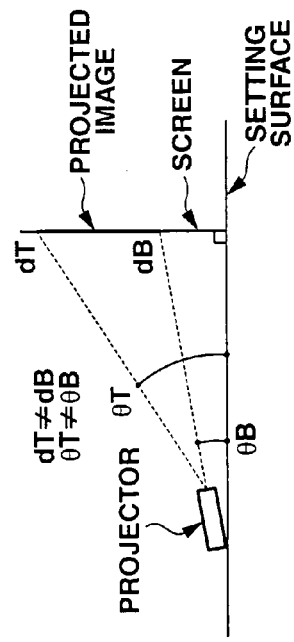
Figure 5D:
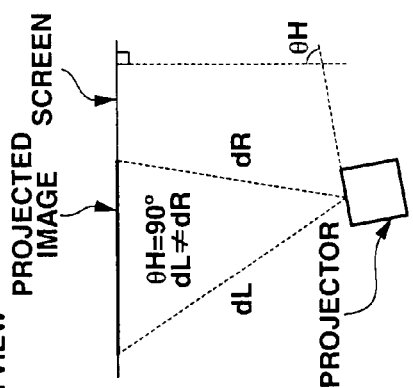

FIGS. 5B, 5D show rear views resulting when the projector 10 is seen from the rear thereof. As shown in FIG. 5C, in a state in which the projector 10 is set horizontally, the projected image becomes the trapezoidal shape in which the left side of the projected image is extended longer. Furthermore, as shown in FIG. 5D, in a state in which the projector 10 is inclined relative to the setting surface (the ground surface), the projected image is rotated, as shown in FIG. 5B.

In the invention, as shown in FIG. 5D, even in the event that the projected image is deformed into a keystone or trapezoidal shape including the rotational deformation due to the inclination of the projector 10 relative to the setting surface, as will be described in first to fourth embodiments, which will be described later on, the outline of the projected image can easily be corrected into a proper rectangle.

First Embodiment

Next, the operation of the projector 10 according to a first embodiment will be described. In the first embodiment, a keystone distortion correction is implemented to a projected image by manually operating the keys.

Figure 6:
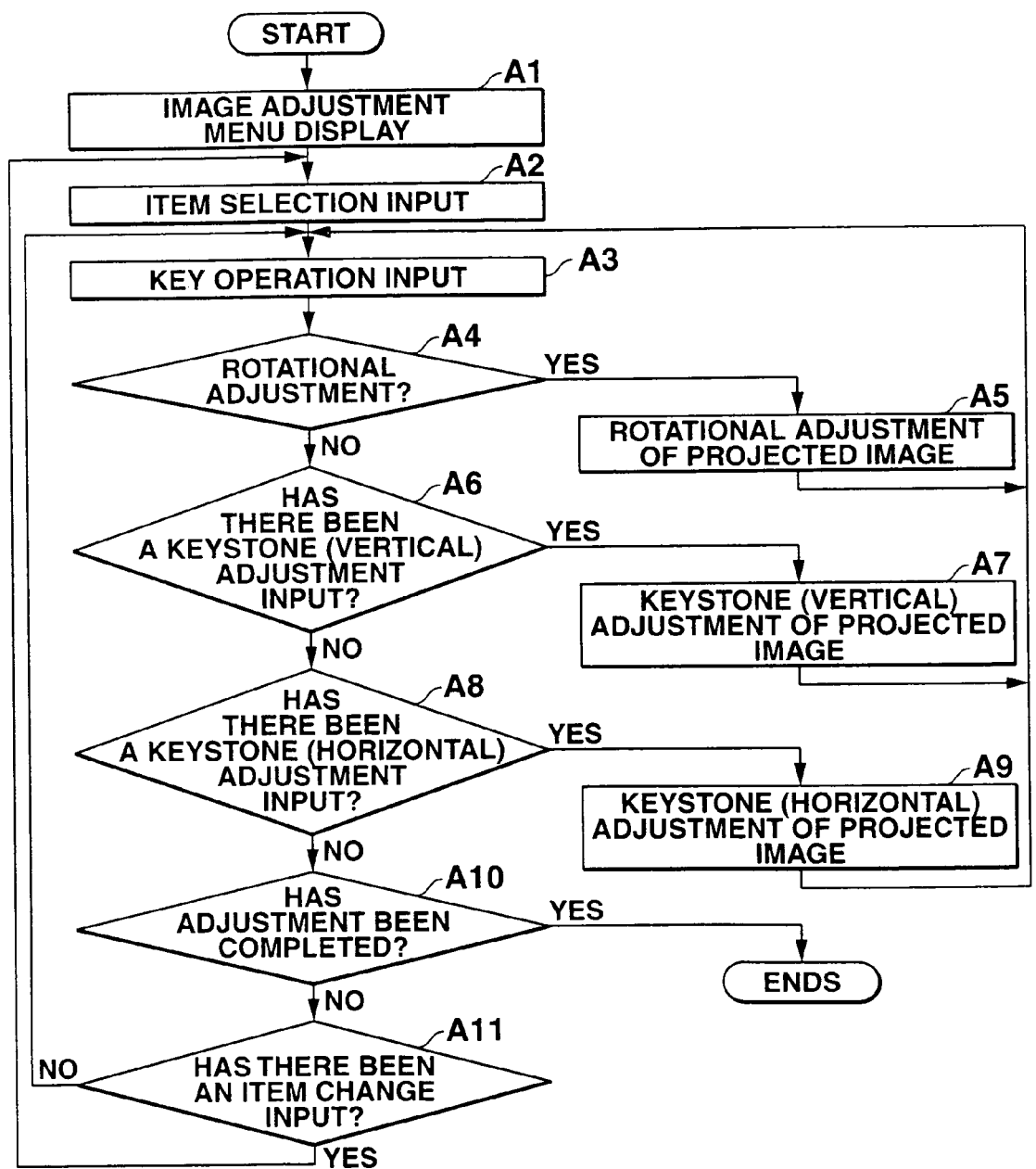
FIG. 6 is a flowchart explaining a keystone deformation correction process according to a first embodiment.
Figure 7:
FIG. 7 is a tabular diagram showing an example of each of the status of an image adjustment menu, deformed image and projected image corresponding to each operation according to the first embodiment.

FIG. 6 shows a flowchart explaining a keystone distortion correction according to the first embodiment. FIG. 7 shows an example of each of the status of an image adjustment menu, deformed image and projected image corresponding to each operation according to the first embodiment. Deformed images in FIG. 7 are such as to explain outlines of images projected from the projector 10 and deformations made thereto, and projected images represent outlines of images which are actually projected on to the screen and changes in outlines which occur when the deformations shown by the deformed images are made.

Firstly, when an execution of keystone distortion correction is required by operating the "Keystone" key 15*h*, the control unit 39 sends out image data of the image adjustment menu for keystone distortion correction to the display encoder 33 so as to be projected on to the screen through the control of the display drive unit 35 (Step A1).

As shown in FIG. 7, the image adjustment menu according to the first embodiment includes "rotation" which indicates the rotation of a projected image, "keystone (vertical)" which makes a left side and a right side of a projected image vertical, and "keystone (horizontal)" which makes an upper side and a lower side of the projected image horizontal.

Here, by operating the "up" key 15*k* or "down" key 15*l*, any of the items including "rotation", "keystone (vertical)" and "keystone (horizontal)" can be selected for designation as required (Step A2).

In addition, operation indicators indicating operating conditions are provided for the respective items such as "rotation", "keystone (vertical)" and "keystone (horizontal)". In the operation indicators, for example, in the case of the operation indicated by "rotation", the relevant operation indicator indicates which of a rightward (clockwise) rotation and a leftward (counterclockwise) rotation is performed to what extent.

Here, when the item of "rotation" is selected and a deformation is indicated through the operation of the "left" key 15*m* or the "right" key 15*n* (Steps A3, A4), the control unit 39 rotates the projected image in response to the operation of the selected key (Step A5).

For example, when an indication of deformation is inputted through the operation of the "left" key 15*m*, the projected image is deformed in such a manner that the projected image is rotated rightward (clockwise), whereas when an indication of deformation is inputted through the operation of the "right" key 15*n*, the projected image is deformed in such a manner that the projected image is rotated leftward (counterclockwise).

In a rotational deformation adjustment shown under (1) in FIG. 7, when a rightward (clockwise) rotation is indicated through the operation of the "left" key 15*m*, as shown by a deformed image, the outline of the projected image is deformed into a similar figure inside the outline (a shape indicated by dotted lines in the drawing) of the original projected image.

A projected image which is deformed in replay to the operation of the key is projected from the projector 10 on to the screen. Consequently, the user continues to operate the key while verifying the projected image being deformed in replay to the operation of the key and then adjusts the outline of the projected image. For example, in the rotational adjustment, as shown by a projected image in the rotational deformation adjustment under (1) in FIG. 7, the operation of rotational deformation continues until the lower side becomes horizontal. Thus, by continuing the deformation until the lower side becomes horizontal, left and right divergent angles become equal.

Next, when there occurs a key operation which changes the item of the "up" key 15*k* or the "down" key 15*l* (Step A11), the control unit 39 sets an item selected through such a key operation (Step A2).

Here, when the item of "keystone (vertical)" is selected and an indication of deformation is inputted through the key operation of the "left" key 15*m* or the "right" key 15*n* (Steps A3, A6), the control unit 39 changes inclined angles of the left and right sides of the outline of the projected image in response to the operation of the selected key (Step A7).

For example, when an indication of deformation is inputted through the operation of the "left" key 15*m*, the outline of the projected image is deformed such that internal angles formed, respectively, by the lower side and the left and right sides of the outline of the projected image are increased, whereas when an indication of deformation is inputted through the operation of the "right" key 15*n*, the outline of the projected image is deformed such that internal angles formed, respectively, by the upper side and the left and right sides of the outline of the projected image are increased.

In a keystone deformation adjustment (vertical) shown under (2) in FIG. 7, when a deformation of the outline of the projected image is indicated through the operation of the "right" key 15*n*, as shown by a deformed image, by deforming the outline (a shape indicated by dotted lines in the drawing on which the rotational deformation adjustment has already been implemented) of the original projected image such that the internal angles formed, respectively, by the upper side and the left and right sides are increased laterally symmetrically, the angles of the left and right sides of the projected image relative to the lower side thereof approach perpendicularity.

Also, in the keystone deformation adjustment (vertical), the adjustment of the outline is implemented by continuing to operate the key while looking at the projected image projected on to the screen by the projector 10. For example, in the keystone deformation adjustment, as shown by the projected image in the keystone deformation adjustment (vertical) shown under (2) in FIG. 7, the operation of keystone or trapezoidal deformation continues until the left and right sides become perpendicular.

Furthermore, similarly to what is described above, when there occurs a key operation which changes the item of the "up" key 15*k* or the "down" key 15*l* (Step A11), the control unit 39 sets an item selected through such a key operation (Step A2)

Here, when the item of "keystone (horizontal)" is selected and an indication of deformation is inputted through the key operation of the "left" key 15*m* or the "right" key 15*n* (Steps A3, A8), the control unit 39 changes the inclined angle of the upper side of the outline of the projected image in response to the operation of the selected key (Step A9).

For example, when an indication of deformation is inputted through the operation of the "left" key 15*m*, the outline of the projected image is deformed such that an internal angle formed by the upper side and the right side of the outline of the projected image is increased so that the upper side becomes horizontal, whereas when an indication of deformation is inputted through the operation of the "right" key 15*n*, the outline of the projected image is deformed such that an internal angle formed by the upper side and the left side of the outline of the projected image is increased.

In a keystone deformation adjustment (horizontal) shown under (3) in FIG. 7, when a deformation of the outline of the projected image is indicated through the operation of the "right" key 15*n*, as shown by a deformed image, the outline (a shape indicated by dotted lines in the drawing on which the rotational deformation adjustment and the keystone deformation adjustment (vertical) have already been implemented) of the original projected image is deformed such that the internal angle formed by the upper side and the left side is increased, whereby the upper side of the projected image can be adjusted so as to approach horizontality.

In also the keystone deformation adjustment (horizontal), the adjustment of the outline is implemented by continuing to operate the key while looking at the projected image projected on to the screen by the projector 10. For example, in the keystone deformation adjustment, as shown by the projected image in the keystone deformation adjustment (horizontal) shown under (3) in FIG. 7, the operation of keystone or trapezoidal deformation continues until the upper side becomes horizontal.

Then, when the "Keystone" key 15*h* is operated again (Step A10), it is determined that the adjustment has been completed, and the operation of keystone distortion correction ends.

Note that according to the description of the first embodiment, the keystone deformation adjustment is performed after the rotational deformation adjustment has been executed, and in the rotational deformation adjustment, the correction is implemented such that the lower side of the outline of the projected image becomes horizontal. Due to this, while the inclined angle of the upper side is changed in the keystone deformation adjustment (horizontal), in the event that the deformation to make the upper side horizontal is performed earlier than the deformation to make the lower side horizontal in the rotational deformation adjustment, the deformation to make the inclined angle of the lower side may be implemented in the keystone deformation adjustment (horizontal).

In addition, while the keystone deformation adjustments (vertical, horizontal) are performed after the rotational adjustment has been performed, it is possible to select a procedure in which the keystone deformation adjustments are executed earlier than the rotational adjustment.

Thus, in the first embodiment, the item denoting a target deformation is selected from the image adjustment menu, and the outline of the projected image can be deformed through the operation of the keys while looking at the projected image that is actually projected by the projector 10. As this occurs, since not only the keystone deformation adjustment but also the rotational deformation adjustment can be executed, even in the event that the projected image is rotated in association with the setting of the projector 10 in the inclined state relative to the setting surface (the ground surface), the adjustment of the projected image is executed optionally by combining the rotational deformation with the keystone or trapezoidal deformation, thereby making it possible to form the outline of the projected image into a proper rectangle.

Second Embodiment

Next, the operation of the projector 10 according to a second embodiment will be described. In the second embodiment, it is made possible to implement a keystone distortion correction on a projected image through not only a manual key operation such as described in the first embodiment but also an automatic operation.

Figure 8:
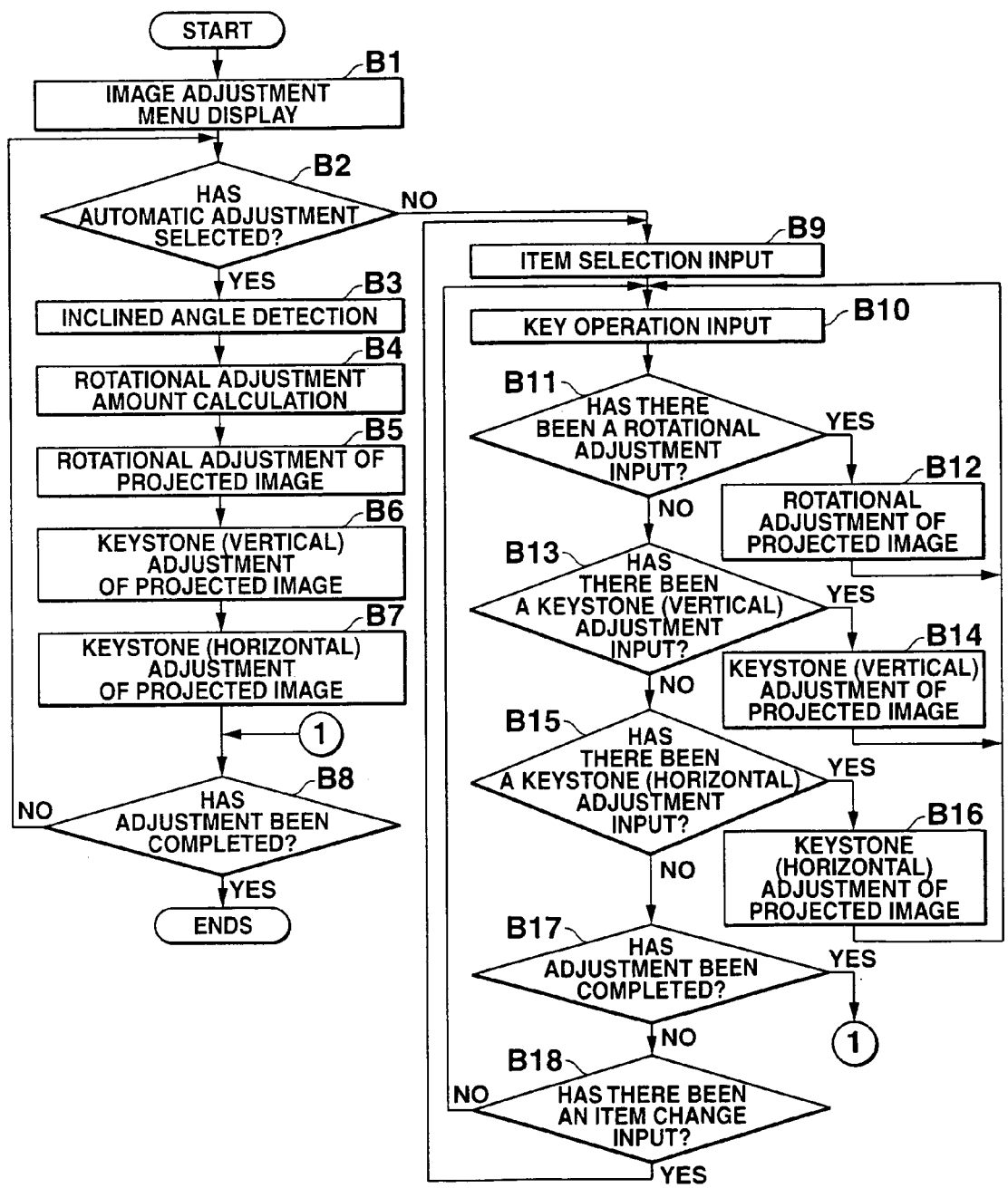
FIG. 8 is a flowchart explaining a keystone deformation correction process according to a second embodiment.
Figure 9:
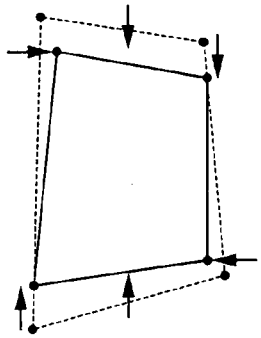
FIG. 9 is a tabular diagram showing an example of each of the status of an image adjustment menu, deformed image and projected image corresponding to each operation according to the second embodiment.

FIG. 8 shows a flowchart which describes a keystone distortion correcting process according to the second embodiment. FIG. 9 shows an example of each of the status of an image adjustment menu, deformed image and projected image corresponding to each operation according to the second embodiment.

Firstly, when the execution of a keystone distortion correction is required through the operation of the "Keystone" key 15*h*, the control unit 39 sends out image data of the image adjustment menu for keystone distortion correction to the display encoder 33 so as to be projected on to the screen through the control of the display drive unit 35 (Step B1).

As shown in FIG. 9, the image adjustment menu according to the second embodiment includes an item indicated as "auto" which selects an automatic correction and an item indicated as "manual" which selects a correction through manual operation. In addition, similarly to the first embodiment, the menu includes "rotation", "keystone (vertical)", "keystone (horizontal)" and operation indicators indicating operating conditions for the respective items. The description of those common to the first embodiment will be omitted.

Here, by operating the "left" key 15*m* or the "right" key 15*n*, either the item "auto" or the item "manual" can be selected for designation optionally (Step B2). Here, in a state in which either of the items is selected (in an image adjustment menu shown in a rotational deformation adjustment row denoted by (1) in FIG. 9, the "auto" is shown as being selected), either auto or manual is selected and determined by depressing, for example, the "Enter" key 15*o*.

Here, when the "manual" is selected, through the operation of the keys by the user, the items, "rotation", "keystone (vertical)" and "keystone (horizontal)" are selected sequentially, whereby, in each item, a required deformation adjustment is executed in response to the manual operation of the selected key. Note that as to the manual keystone or trapezoidal deformation process (Steps B9 to B18), assuming that the steps are executed similarly to those of the first embodiment, the detailed description thereof will be omitted (refer to FIG. 6).

On the other hand, when the "auto" is selected, the control unit 39 executes automatically a rotational deformation adjustment and keystone deformation adjustments (vertical, horizontal) as follows without key operations by the user.

Firstly, the control unit 39 obtains inclined angle information which indicates the inclined angle of the projector 10, detected by the inclined angle detection unit 44, relative to the horizontal plane in a set condition (Step B3), so that a rotational adjustment amount is calculated which is required for implementation of a rotational deformation adjustment on a projected image in accordance with the inclined angle indicated by this information (Step B4). The inclined angle detected by the inclined angle detection unit 44 is an angle θR in a direction normal to the projecting direction shown in FIG. 5D. When the projector 10 is set in an inclined state, as shown in FIG. 5D, a projected image is rotated, and the rotational amount increases as the inclined angle increases. The control unit 39 calculates based on a relationship between the inclined angle and the rotation amount of the projected image a rotational adjustment amount which corresponds to the inclined angle information obtained by the inclined angle detection unit 44 and which is needed to correct the rotation of the projected image.

The control unit 39 rotates the projected image in accordance with the rotational adjustment amount so calculated (Step B5), whereby a lower side of the projected image becomes horizontal, and the projected image is deformed such that divergent angles of left and right sides relative to the lower side become equal to each other (refer to a deformed image and a projected image in the rotational deformation adjustment denoted by (1) in FIG. 9).

Next, the control unit 39 executes a keystone deformation adjustment (vertical) on the projected image which has been subjected the rotational deformation adjustment (Step B6) Here, when the projected image is rotated rightward (clockwise) in the rotational deformation adjustment, the projected image is deformed such that the right side thereof becomes vertical as a deformed image. As this occurs, the projected image is deformed such that internal angles formed, respectively, by the upper side and the left and right sides are increased laterally symmetrically.

Next, the control unit 39 executes a keystone deformation adjustment (horizontal) on the projected image which has been subjected to the keystone deformation adjustment (vertical) so as to change the inclined angle of the upper side of the outline of the projected image (Step B7). Then, when the "Keystone" key 15*h* is depressed again (Step B8), it is determined that the adjustment has been completed, and the operation of keystone distortion correction ends.

Thus, by automatically executing the keystone deformation adjustment (horizontal) on the projected image that has already been subjected to the keystone deformation adjustment (vertical), as shown by a projected image illustrated under (3) in FIG. 9, the outline of the projected image can be corrected into a rectangle.

Note that when a fine adjustment is wanted to be made on the outline of the projected image after the automatic adjustment has been executed thereon, either of the items, "auto" and "manual", can be selected for designation as required through the operation of the selected key.

Here, when the item of "manual" is selected, by processing Steps B9 to B18, a required fine adjustment can be performed through a deformation adjustment triggered in response to the operation of the selected key by the user.

Thus, in the second embodiment, since through the execution of the automatic adjustment, the inclined angle of the projector 10 is detected, so that the rotational adjustment amount of the projected image is then calculated based on the inclined angle so detected, whereby the rotational deformation adjustment is executed on the projected image in accordance with the rotational adjustment amount so calculated, the outline of the projected image can be corrected into a proper rectangle by automatically executing the rotational deformation adjustment and furthermore, executing the keystone deformation adjustments (vertical, horizontal).

Note that similarly to the first embodiment, the procedure for executing the rotational deformation adjustment and the keystone deformation adjustments (vertical, horizontal) may be made to differ from what has been described heretofore.

Third Embodiment

Next, the operation of the projector 10 according to a third embodiment will be described. In the third embodiment, the rotation of a projected image can be corrected by changing the set condition of the projector 10 through extension or contraction of the adjustment leg portions 22 in response to the manual operation of the keys.

Figure 10:
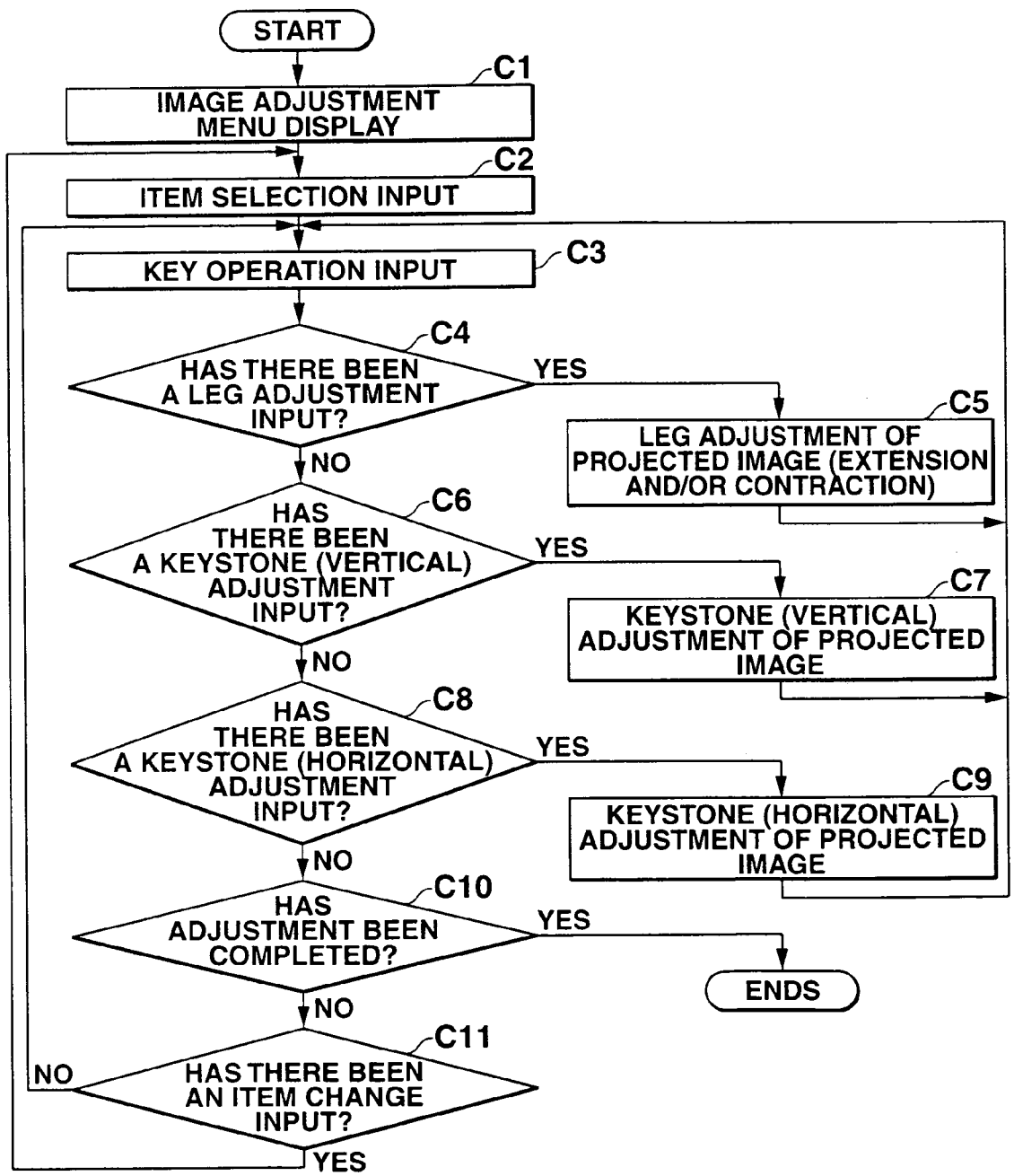
FIG. 10 is a flowchart explaining a keystone deformation correction process according to a third embodiment.
Figure 11:
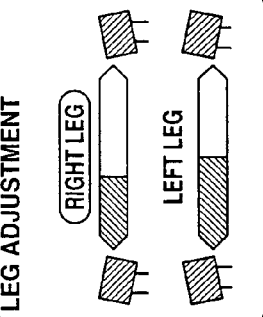
FIG. 11 is a tabular diagram showing an example of each of the status of an image adjustment menu, deformed image and projected image corresponding to each operation according to the third embodiment.

FIG. 10 shows a flowchart describing a keystone distortion correcting process according to the third embodiment. FIG. 11 shows an example of each of the status of an image adjustment menu, deformed image and projected image corresponding to each operation according to the third embodiment.

Firstly, when the execution of a keystone distortion correction is required through the operation of, for example, the "Keystone" key 15*h*, the control unit 39 sends out image data of the image adjustment menu for keystone distortion correction to the display encoder 33 so as to be projected on to the screen through the control of the display drive unit 35 (Step C1).

As shown in FIG. 11, the image adjustment menu according to the third embodiment includes items of "leg setting adjustment" which rotates a projected image by performing a leg setting adjustment, "keystone (vertical)" which makes left and right sides of the projected image vertical and "keystone (horizontal)" which makes upper and lower sides of the projected image horizontal.

Here, any item can optionally be selected for designation from the "leg adjustment", "keystone (vertical)" and "keystone (horizontal)" by operating, for example, the "up" key 15*k* or "down" key 15*l* (Step C2).

As shown in a row described as leg setting adjustment under (1) in FIG. 11, items are provided which includes a "right leg" which indicates extension and contraction of the right adjustment leg portion 22 of the two adjustment leg portions 22 and a "left leg" which indicates extension and contraction of the other left adjustment leg portion 22. Here, either of the items, "right leg" and "left leg", can optionally be selected for designation by operating, for example, the "menu" key 15*g*. Here, when the item of "right leg" is selected and an indication of deformation is inputted by operating the "left" key 15*m* or the "right" key 15*n* (Steps C3, C4), the control unit 39 makes the adjustment leg drive unit 46 extend or contract the adjustment leg portion 22 provided on the right side in replay to the operation of the selected key (Step C5).

For example, when the "left" key 15*m* is operated, the right adjustment leg portion 22 is shortened, whereas when the "right" key 15*n* is operated, the right adjustment leg portion 22 is lengthened.

In the leg setting adjustment shown under (1) in FIG. 11, by shortening the right adjustment leg portion 22 in response to the operation of the "left" key 15*m*, the projector 10 is inclined such that the left side of the projector 10 is raised. Consequently, a projected image projected on to the screen by the projector 10 is rotated clockwise as shown by a projected image in the row of leg setting adjustment denoted by (1) in FIG. 11. Here, there is no adjustment made on the projected image projected from the projector 10.

The user adjusts the rotation of the projected image by continuing to operate the key while looking at the projected image being changed by making the adjustment leg portion 22 extend or contract through the operation of the key. For example, as shown by the projected image illustrated in the row of leg setting adjustment denoted by (1) in FIG. 11, the operation of leg setting adjustment continues to be performed until the lower side of the projected image becomes horizontal.

Note that while, in the description that has just been made above, in the leg setting adjustment, either of the "right leg" and the "left leg" is selected, so that the adjustment leg portion 22 corresponding to the selected key is made to extend or contract, whereby the projector 10 is inclined, the projector 10 may be made to incline by making the two adjustment leg portions 22 extend and contract individually at the same time. Namely, when the right side of the projector 10 is attempted to be raised, the right adjustment leg portion 22 may be made to extend, while the left adjustment leg portion 22 may be made to contract (when the projector 10 is attempted to be inclined oppositely, the extension and contraction of the adjustment leg portions 22 are reversed).

Next, when there occurs a key operation to change the items via the "up" key 15k or the "down" key 15l (Step C11), the control unit 39 sets the item selected in response to the key operation (Step C2).

Here, when the item of "keystone (vertical)" is selected, and an indication of deformation is inputted by operating the "left" key 15m or the "right" key 15n (Steps C3, C6), the control unit 39 has inclined angles of the left and right sides of the outline of the projected image changed in response to the operation of the selected key (Step C7). Note that since it is assumed that a deformation (change adjustment) in response to the operation of each key is executed similarly to that of the first embodiment, the description thereof will be omitted.

In a keystone deformation adjustment (vertical) illustrated under (2) in FIG. 11, when a deformation of the outline of the projected image is indicated by operating the "right" key 15n, as shown by a deformed image, by deforming the outline (a rectangular shape indicated by dotted lines in the drawing) of the projected image such that internal angles formed, respectively, by the upper side and the left and right sides of the outline are increased laterally symmetrically, the angles of the left and right sides relative to the lower side approach the perpendicularity.

The user adjusts the outline by continuing to operate the key while looking at the projected image projected on to the screen by the projector 10. For example, in the keystone deformation adjustment, as shown by a projected image in the row of keystone deformation adjustment (vertical) denoted by (2) in FIG. 11, the operation of keystone or trapezoidal deformation continues until the left and right side becomes vertical.

Furthermore, similarly to what has been described before, when there occurs a key operation to change the items via the "up" key 15k or the "down" key 15l (Step C11), the control unit 39 sets the item selected in response to the key operation (Step C2)

Here, when the item of "keystone (horizontal)" is selected, and an indication of deformation is inputted by operating the "left" key 15m or the "right" key 15n (Steps C3, C8), the control unit 39 has the inclined angle of the upper side of the outline of the projected image changed in response to the operation of the selected key (Step C9). Then, when the "Keystone" key 15h is operated again (Step C10), it is determined that the adjustment has been completed, and the operation of keystone distortion correction ends.

Note that since it is assumed that a deformation (change adjustment) in response to the operation of each key is executed similarly to that of the first embodiment, the description thereof will be omitted.

In a keystone deformation adjustment (horizontal) illustrated under (3) in FIG. 11, when a deformation of the outline of the projected image is indicated by operating the "right" key 15n, as shown by a deformed image, the outline (in the drawing, a shape indicated by dotted lines which has already been subjected to the keystone deformation adjustment (vertical)) of the projected image is deformed such that an internal angle formed by the upper side and the left side of the outline is increased, whereby the upper side of the projected image can be adjusted so as to approach the horizontality.

Also, in the keystone deformation adjustment (horizontal), the user adjusts the outline by continuing to operate the key while looking at the projected image projected on to the screen by the projector 10. For example, in the keystone deformation adjustment, as shown by a projected image in the row of keystone deformation adjustment (horizontal) denoted by (3) in FIG. 11, the operation of keystone or trapezoidal deformation continues until the upper side becomes horizontal.

Thus, in the third embodiment, by providing the adjustment leg portions 22 which can incline the projector 10, the inclination of the projector 10 in the set condition is changed by controlling the extension and contraction of the adjustment leg portions 22 through, for example, the manual operation of the keys, so that the rotation of the projected image can be corrected. In addition, by combining this adjustment with the keystone deformation adjustments (vertical, horizontal) which can be executed similarly through the manual operation of the keys, the adjustment of the projected image is executed optionally, whereby the outline of the projected image can be formed into a proper rectangle. In addition, in the correction of the projected image according to the third embodiment, since the projected image can be made to have a wider area than those of the projected images that are eventually obtained by the corrections described in the first and second embodiments, the projected image can be made to be more visible, and the loss of projected image information can also be prevented.

Note that similarly to the first embodiment, the procedure for performing the keystone deformation adjustments (vertical, horizontal) may be made to differ from what has just been described above.

In addition, similarly to the second embodiment, the keystone deformation adjustments (vertical, horizontal) may be performed automatically after the inclination of the projector 10 in the set condition has been changed by controlling the extension and contraction of the adjustment leg portions 22.

Fourth Embodiment

Next, the operation of the projector 10 according to a fourth embodiment will be described. In the fourth embodiment, it is made possible to implement a keystone distortion correction on a projected image through not only a manual key operation such as described in the third embodiment but also an automatic operation.

Figure 12:
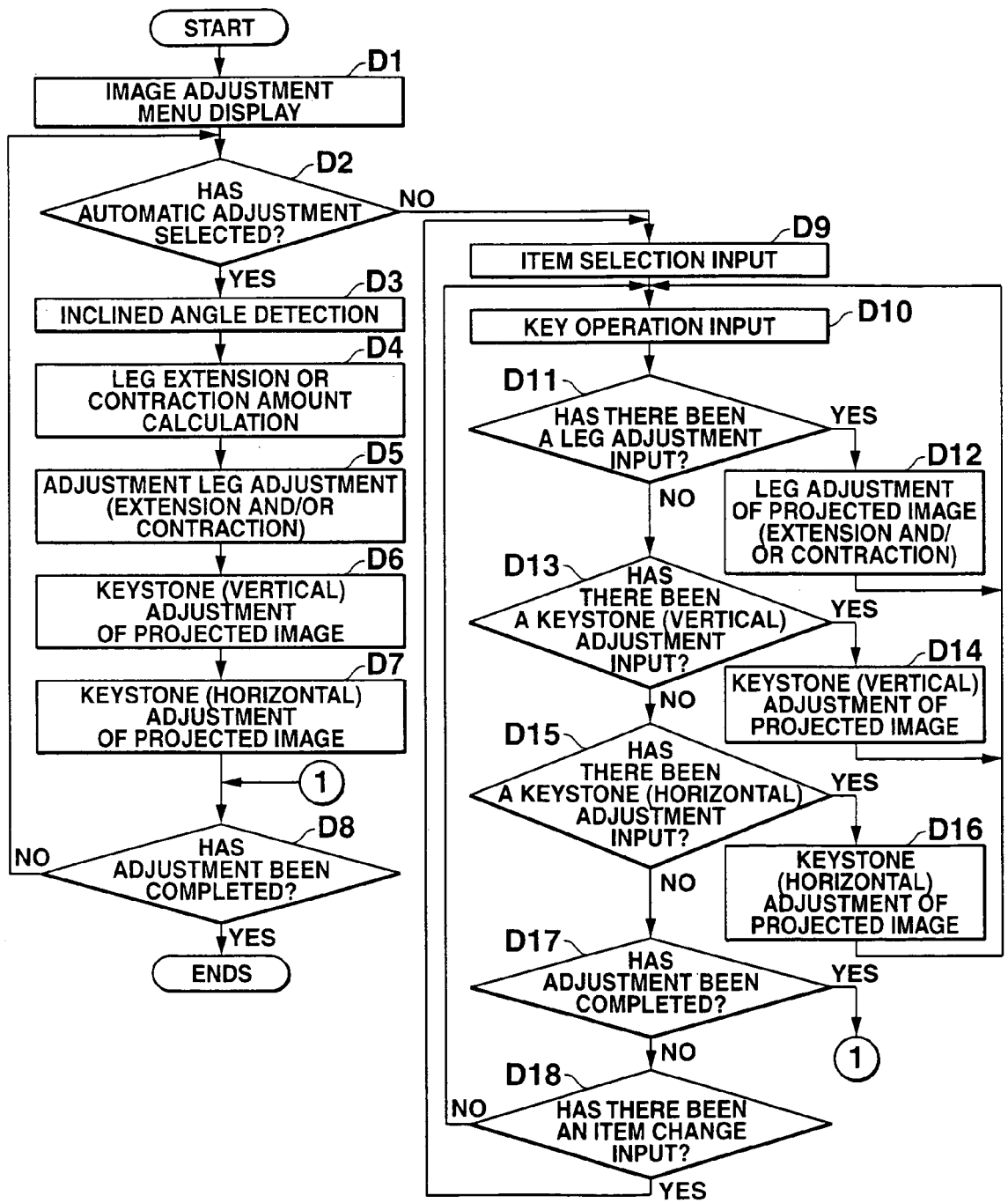
FIG. 12 is a flowchart explaining a keystone deformation correction process according to a fourth embodiment.
Figure 13:
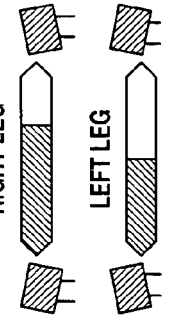
FIG. 13 is a tabular diagram showing an example of each of the status of an image adjustment menu, deformed image and projected image corresponding to each operation according to the fourth embodiment.

FIG. 12 shows a flowchart which describes a keystone distortion correcting process according to the fourth embodiment. FIG. 13 shows an example of each of the status of an image adjustment menu, deformed image and projected image corresponding to each operation according to the fourth embodiment.

Firstly, when an execution of keystone distortion correction is required by operating, for example, the "Keystone" key 15h, the control unit 39 sends out image data of an image adjustment menu for keystone distortion correction to the display encoder 33, so that an image is projected on to the screen by controlling the display drive unit 35 (Step D1).

The image adjustment menu according to the fourth embodiment includes, as shown in a leg setting adjustment row denoted by (1) in FIG. 13, items including "auto" which selects an automatic correction and "manual" which selects a correction through manual operation. The remaining part of the fourth embodiment is similar to the third embodiment.

Here, by operating the "left" key 15m or the "right" key 15n, either the item "auto" or the item "manual" can be selected for designation optionally (Step D2). Here, in a state in which either of the items is selected (in an image adjustment menu shown in a rotational deformation adjustment row denoted by (1) in FIG. 13, the "auto" is shown as being selected), either auto or manual is selected and determined by depressing, for example, the "Enter" key 15o.

Here, when the "manual" is selected, the user is allowed to operate a key so as to select either an item, "right leg", or an item, "left leg", from the menu in the leg setting adjustment row, a leg setting adjustment is executed in response to the operation of the selected key. Note that assuming that a manual leg setting adjustment process (Steps D9 to D18) is executed in a similar manner to that of the third embodiment, a detailed description thereof will be omitted (refer to FIG. 10).

On the other hand, when the "auto" is selected, the control unit 39 executes automatically leg setting adjustment and keystone deformation adjustments (vertical, horizontal) as follows without key operations by the user.

Firstly, the control unit 39 obtains inclined angle information which indicates the inclined angle of the projector 10, detected by the inclined angle detection unit 44, relative to the horizontal plane in a set condition (Step D3), so that a leg extension or contraction amount is calculated which is required to make the projector 10 horizontal in accordance with the inclined angle indicated by this information. The inclined angle detected by the inclined angle detection unit 44 is an angle θR in a direction normal to the projecting direction shown in FIG. 5D. When the projector 10 is set in an inclined state, as shown in FIG. 5D, a projected image is rotated, and the rotational amount increases as the inclined angle increases. The control unit 39 calculates, based on a relationship between the inclined angle and the rotation amount of the projected image, an extension or contraction amount of the adjustment leg portions 22 which corresponds to the inclined angle information obtained by the inclined angle detection unit 44 and which is needed to make the projector 10 horizontal.

The control unit 39 makes the adjustment leg drive unit 46 extend or contract the adjustment leg portions 22 in accordance with the extension or contraction amount so calculated (Step D4). Note that in the leg setting adjustment according to the fourth embodiment, either of the two adjustment leg portions 22 may be made to extend or contract for adjustment, or the both adjustment leg portions 22 may be made to extend and/or contract individually (for example, one of the adjustment leg portions 22 is made to extend, whereas the other adjustment leg portion 22 is made to contract) for adjustment.

From these operations, the lower side of the outline of the projected image becomes horizontal, whereby the projected image is deformed such that the divergent angles of the left and right sides relative to the lower side become identical (refer to a deformed image and a projected image in the leg setting adjustment row denoted by (1) in FIG. 13).

Next, the control unit 39 executes a keystone deformation adjustment (vertical) on the projected image which has been subjected the leg setting adjustment (Step D6). Here, when the adjustment leg portion 22 is made to extend or contract in such a manner that the projected image rotates rightward (clockwise), the projected image is deformed such that the right side thereof becomes vertical as a deformed image. As this occurs, the projected image is deformed such that internal angles formed, respectively, by the upper side and the left and right sides are increased laterally symmetrically.

Next, the control unit 39 executes a keystone deformation adjustment (horizontal) on the projected image which has been subjected to the keystone deformation adjustment (vertical) so as to change the inclined angle of the upper side of the outline of the projected image (Step D7). Then, when the "Keystone" key 15h is depressed again (Step D8), it is determined that the adjustment has been completed, and the operation of keystone distortion correction ends.

Thus, by automatically executing the leg setting adjustment and the keystone deformation adjustments (vertical, horizontal), as shown by a projected image illustrated under (3) in FIG. 13, the outline of the projected image can be corrected into a proper rectangle.

Note that when a fine adjustment is wanted to be made on the outline of the projected image after the automatic adjustment has been executed thereon, either of the items, "auto" and "manual", can be selected for designation as required through the operation of the selected key.

Here, when the item of "manual" is selected, by processing Steps B9 to B18, a required fine adjustment can be performed through a deformation adjustment triggered in response to the operation of the selected key by the user.

In addition, while, in the aforesaid description, when the "auto" is selected in the leg setting adjustment, the "auto" is also set for the keystone deformation adjustments (vertical, horizontal) so that those adjustments are executed automatically without manually operating the keys, it may be made possible to select the "auto" or "manual" individually for each of the leg setting adjustment and the keystone deformation adjustments (vertical, horizontal). For example, the let setting adjustment can be performed by operating the keys as has been described in the third embodiment, whereas the keystone deformation adjustments (vertical, horizontal) can be performed automatically.

Thus, according to the fourth embodiment, by providing the adjustment leg portions 22 which can incline the projector 10, the setting state of the projector 10 is automatically adjusted to become horizontal, and furthermore, by executing the keystone deformation adjustments (vertical, horizontal), the outline of the projected image can be formed into a proper rectangle. In addition, in the correction of the projected image according to the fourth embodiment, since the projected image can be made to have a wider area than those of the projected images that are eventually obtained by the corrections described in the first and second embodiments, the projected image can be made to be more visible, and the loss of projected image information can also be prevented.

Note that similarly to the first embodiment, the procedure for performing the keystone deformation adjustments (vertical, horizontal) may be made to differ from what has just been described above.

In addition, while, in the aforesaid second and fourth embodiments, the correcting process is executed in response to the key operation, for example, the execution of the process may be designed to start automatically as soon as power is supplied to the projector apparatus. Additionally, in this case, it may be possible to set the apparatus such that whether or not the process is automatically started when power is so supplied is determined in advance. Furthermore, by making it possible to detect the movement of the projector 10, the process can also be designed to be started upon detecting (e.g., by the acceleration sensor/movement detector 42 as described above) a change in the setting position of the projector 10.

Furthermore, the embodiments that have been described heretofore includes the inventions in a variety of stages, and a variety of inventions can be extracted through appropriate combinations of the plurality of constituent elements so disclosed. For example, even in case some constituent elements are deleted from the whole constituent elements, in the event that at least one of the problems that have been described as being solved by the invention can be solved and at least one of the advantages described as being provided by the invention, the constituent elements from which the some constituent elements were deleted can be extracted as an invention.

What is claimed are:

1. A projector comprising:
   a projection unit which projects an image in response to an inputted image signal;
   a detection unit which detects an inclined angle of the projector;
   a calculation unit which calculates a rotational adjustment amount for the projected image based on the detected inclined angle;
   a rotational deformation unit which rotationally deforms the projected image in accordance with the calculated rotational adjustment amount; and
   a movement detector which detects vibrations generated when a setting position of the protector is changed;
   wherein the rotational adjustment amount is calculated by the calculation unit and the projected image is rotationally deformed by the rotational deformation unit when power is supplied to the projector and vibrations are detected by the movement detector.

2. A projector as set forth in claim 1, further comprising a keystone deformation unit which deforms the projected image that has been rotationally deformed by the rotational deformation unit into a rectangle.

3. A projector as set forth in claim 1, further comprising a deformation setting unit which sets whether or not to execute the rotational deformation on the projected image by the rotational deformation unit, wherein the rotational deformation unit executes the rotational deformation when the execution of the rotational deformation is set by the deformation setting unit.

4. A projection method for projecting an image using a projector comprising:
   projecting the image in response to an inputted image signal;
   detecting an inclined angle of the projector;
   calculating a rotational adjustment amount for the projected image based on the detected inclined angle;
   rotationally deforming the projected image in accordance with the calculated rotational adjustment amount; and
   detecting vibrations generated when a setting position of the projector is changed;
   wherein, when power is supplied to the projector and vibrations are detected, the rotational adjustment amount is calculated and the projected image is rotationally deformed.

5. A computer-readable recording medium having a program stored thereon that is executable by a control unit of a projector for projecting an image, to cause the control unit to control the projector to perform functions comprising:
   projecting the image in response to an inputted image signal;
   detecting an inclined angle of the projector;
   calculating a rotational adjustment amount for the projected image based on the detected inclined angle;
   rotationally deforming the projected image in accordance with the calculated rotational adjustment amount; and
   detecting vibrations generated when a setting position of the projector is changed;
   wherein, when power is supplied to the projector and vibrations are detected, the rotational adjustment amount is calculated and the projected image is rotationally deformed.

* * * * *